United States Patent
Chang et al.

(10) Patent No.: US 6,563,457 B2
(45) Date of Patent: *May 13, 2003

(54) METHOD AND SYSTEM FOR DETERMINING A POSITION OF AN OBJECT USING TWO-WAY RANGING IN A POLYSTATIC SATELLITE CONFIGURATION

(75) Inventors: Donald C. D. Chang, Thousand Oaks, CA (US); Kar W. Yung, Torrance, CA (US); John I. Novak, III, West Hills, CA (US); Robert R. Holden, Santa Monica, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/001,501

(22) Filed: Nov. 14, 2001

(65) Prior Publication Data

US 2002/0053987 A1 May 9, 2002

Related U.S. Application Data

(63) Continuation of application No. 08/803,937, filed on Feb. 21, 1997, now Pat. No. 6,377,208.

(51) Int. Cl.[7] .............................. G01S 1/24; H04B 7/185
(52) U.S. Cl. ................... 342/357.01; 342/353; 342/387
(58) Field of Search ........................... 342/357.01, 353, 342/387, 453, 464, 59, 126

(56) References Cited

U.S. PATENT DOCUMENTS

| 2,470,787 A | 5/1949 | Nosker | 342/125 |
| 2,763,857 A | 9/1956 | Valley | 342/12 |
| 2,821,704 A | 1/1958 | O'Day | 343/15 |
| 3,254,341 A | 5/1966 | Broussaud | 343/112 |

(List continued on next page.)

FOREIGN PATENT DOCUMENTS

| EP | 0335 558 | 4/1989 |
| EP | 0 860 708 A2 | 8/1998 |
| EP | 0 860 709 A2 | 8/1998 |

(List continued on next page.)

OTHER PUBLICATIONS

Griffiths, H. D. et al, "Bistatic Radar Using Satellite Borne Illuminators of Opportunity", International Conf. Radar 92, pp. 276–27.*

(List continued on next page.)

Primary Examiner—Gregory C. Issing
(74) Attorney, Agent, or Firm—V. D. Duraiswamy; M. W. Sales

(57) ABSTRACT

A method and system for determining a position of an object utilizes two-way ranging and polystatic techniques. A first communication transceiver at a first known location provides a bidirectional communication path between the first communication transceiver and the object wherein the first communication transceiver transmits a first ranging signal to the object and the object transmits a second ranging signal to the first communication transceiver in response to the first ranging signal. The first communication transceiver further provides a first unidirectional communication path between the first communication transceiver and the object wherein the first communication transceiver performs one of transmitting a third ranging signal to the object and receiving a fourth ranging signal from the object. A second communication transceiver at a second known location provides a second unidirectional communication path between the second communication transceiver and the object wherein the second communication transceiver performs one of transmitting a third ranging signal to the object and receiving a fourth ranging signal from the object. A signal processor determines a first path length corresponding to a first time length of the bidirectional communication path, a second path length corresponding to a second time length of the first and second unidirectional communication paths, and the position of the object based on the first and second known locations and the first and second path lengths.

9 Claims, 4 Drawing Sheets

U.S. PATENT DOCUMENTS

| | | | |
|---|---|---|---|
| 3,384,891 A | 5/1968 | Anderson | 342/357 |
| 3,544,995 A | 12/1970 | Bottenberg et al. | 342/46 |
| 3,665,464 A | 5/1972 | Meilander | 343/6.5 R |
| 3,668,403 A | 6/1972 | Meilander | 235/150.23 |
| 4,161,730 A | 7/1979 | Anderson | 342/352 |
| 4,161,734 A | 7/1979 | Anderson | 342/352 |
| 4,359,733 A | 11/1982 | O'Neill | 343/6.5 LC |
| 4,613,864 A | 9/1986 | Hofgen | 343/357 |
| 4,758,959 A | 7/1988 | Thoone et al. | 364/454 |
| 4,897,661 A | 1/1990 | Hiraiwa | 342/457 |
| 4,994,809 A | 2/1991 | Yung et al. | 342/108 |
| 5,006,855 A | 4/1991 | Braff | 342/357 |
| 5,097,269 A * | 3/1992 | Takayama et al. | 342/453 |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,181,041 A * | 1/1993 | Lind et al. | 342/453 |
| 5,187,485 A * | 2/1993 | Tsui et al. | 342/357.06 |
| 5,365,447 A | 11/1994 | Dennis | 364/449 |
| 5,387,916 A | 2/1995 | Cohn | 342/44 |
| 5,410,314 A | 4/1995 | Frush et al. | 342/26 |
| 5,444,450 A | 8/1995 | Olds et al. | 342/357 |
| 5,525,995 A | 6/1996 | Benner | 342/90 |
| 5,739,785 A | 4/1998 | Allison et al. | 342/357 |
| 5,920,284 A | 7/1999 | Victor | 342/357.01 |
| 5,944,770 A | 8/1999 | Enge et al. | |
| 5,945,948 A | 8/1999 | Buford et al. | 342/457 |
| 5,969,674 A | 10/1999 | Von der Embse et al. | 342/357.17 |
| 6,229,477 B1 | 5/2001 | Chang et al. | 342/357 |
| 6,246,363 B1 | 6/2001 | Yung et al. | 342/357 |
| 6,313,790 B2 | 11/2001 | Chang et al. | 342/357 |
| 6,340,947 B1 | 1/2002 | Chang et al. | 342/357.01 |

FOREIGN PATENT DOCUMENTS

| | | |
|---|---|---|
| EP | 0 860 710 A2 | 8/1998 |
| FR | 2 621 132 A1 | 3/1989 |
| GB | 2271 902 A | 10/1993 |
| GB | 2306 827 A | 5/1997 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| WO | WO 98/02762 | 1/1998 |

OTHER PUBLICATIONS

Teles J. et. al, "Overview of TDRSS" Orbit Determination and Analysis, PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker, P. et. al, "Integrated Receiver for NASA Tracking and Data Relay Satellite System", MILCOM 90, A New Era, 1990 IEEE Military Communications Conference, Monterey, CA USA, Sep. 30–Oct. 3, 1990, pp. 1–5.

Dunham, J. B. et. al, "Onboard Orbit Estimation with Tracking and Data Relay Satellite System Data", Journal of Guidance, Control and Dynamics, Jul.–Aug. 1983, USA, col. 6 NR.4, pp. 292–301.

Bethke, K.H., A Novel Noncooperative Near–Range Radar Network For Traffic Guidance and Control on Airport Surfaces, IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

* cited by examiner

METHOD AND SYSTEM FOR DETERMINING A POSITION OF AN OBJECT USING TWO-WAY RANGING IN A POLYSTATIC SATELLITE CONFIGURATION

CROSS-REFERENCE TO RELATED APPLICATIONS

This application is a continuation of U.S. application Ser. No. 08/803,937, filed on Feb. 21, 1997, now U.S. Pat. No. 6,377,208, entitled "Method and System for Determining a Position of a Transceiver Unit Utilizing Two-Way Ranging in a Polystatic Satellite Configuration." This application is related to U.S. application Ser. No. 08/803,936, filed on Feb. 21, 1997, now U.S. Pat. No. 5,969,674, entitled "Method and System for Determining a Position of a Target Vehicle Utilizing Two-Way Ranging" and is further related to U.S. application Ser. No. 09/746,997, filed on Dec. 22, 2000, now U.S. Pat. No. 6,340,947, entitled "Method And System For Determining A Position Of A Transceiver Unit Utilizing Two-Way Ranging in a Polystatic Satellite Configuration Including a Ground Radar," which was a continuation of U.S. application Ser. No. 08/803,935, filed on Feb. 21, 1997, now abandoned.

TECHNICAL FIELD

This invention relates to methods and systems for determining a position of a transceiver unit, such as those provided on an airplane or a surface vehicle, utilizing two-way ranging through multiple satellites.

BACKGROUND ART

Current Automatic Dependent Surveillance (ADS) technology, such as Global Positioning System (GPS), Wide Area Augmentation System (WAAS) or GLONASS, provides positioning information utilizing satellite transmissions. For example, the GPS, developed and deployed by the U.S. Department of Defense, consists of 24 satellites orbiting the earth twice a day at an altitude of 12,000 miles, as well as five ground stations to monitor and manage the satellite constellation. Using atomic clocks and location data, GPS satellites transmit continuous time and position information 24 hours a day to a GPS receiver, which listens to three or more satellites at once to determine the user's position. By measuring the time interval between the transmission and the reception of a satellite signal, the GPS receiver calculates the distance between the user and each satellite, and then uses the distance measurements of at least three satellites to arrive at a position.

Such systems, however, utilize one-way ranging in which an accurate, synchronized clock is required at each station. Any synchronization error or error regarding the location of one of the satellites results in an error in the determined position of the target vehicle. Thus, there is a need to provide very accurate position and velocity information with a high degree of integrity and reliability.

DISCLOSURE OF THE INVENTION

It is thus a general object of the present invention to provide a method and system for determining a position of an object, such as an airplane or a surface vehicle, utilizing two-way ranging in a polystatic satellite configuration to derive independent estimates of the transceiver's state vectors including position and velocity.

In carrying out the above object and other objects, features, and advantages of the present invention, a method is provided for determining a position of the object. The method includes the steps of transmitting a first ranging signal from a first known location to the position and transmitting a second ranging signal in response to the first ranging signal to the first known location. The method also includes the steps of transmitting a third ranging signal from a second known location to the position and transmitting a fourth ranging signal to a third known location in response to the third ranging signal. The method further includes the step of determining a first delay corresponding to a time difference between transmission of the first ranging signal and receipt of the second ranging signal. The method also includes the step of determining a second delay corresponding to a time difference between transmission of the third ranging signal and receipt of the fourth ranging signal. Finally, the method includes the step of determining the position of the object based on the first, second, and third known locations and the first and second delays.

In further carrying out the above object and other objects, features, and advantages of the present invention, a system is also provided for carrying out the steps of the above described method. The system includes a first communication transceiver at a first known location for providing a bidirectional communication path between the first communication transceiver and the object wherein the first communication transceiver transmits a first ranging signal to the object and the object transmits a second ranging signal to the first communication transceiver in response to the first ranging signal. The first communication transceiver further provides a first unidirectional communication path between the first communication transceiver and the object wherein the first communication transceiver performs one of transmitting a third ranging signal to the object and receiving a fourth ranging signal from the object. The system also includes a second communication transceiver at a second known location for providing a second unidirectional communication path between the second communication transceiver and the object wherein the second communication transceiver performs one of transmitting a third ranging signal to the object and receiving a fourth ranging signal from the object. The system further includes a signal processor for determining a first path length corresponding to a first time length of the bidirectional communication path, determining a second path length corresponding to a second time length of the first and second unidirectional communication paths, and determining the position of the object based on the first and second known locations and the first and second path lengths.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
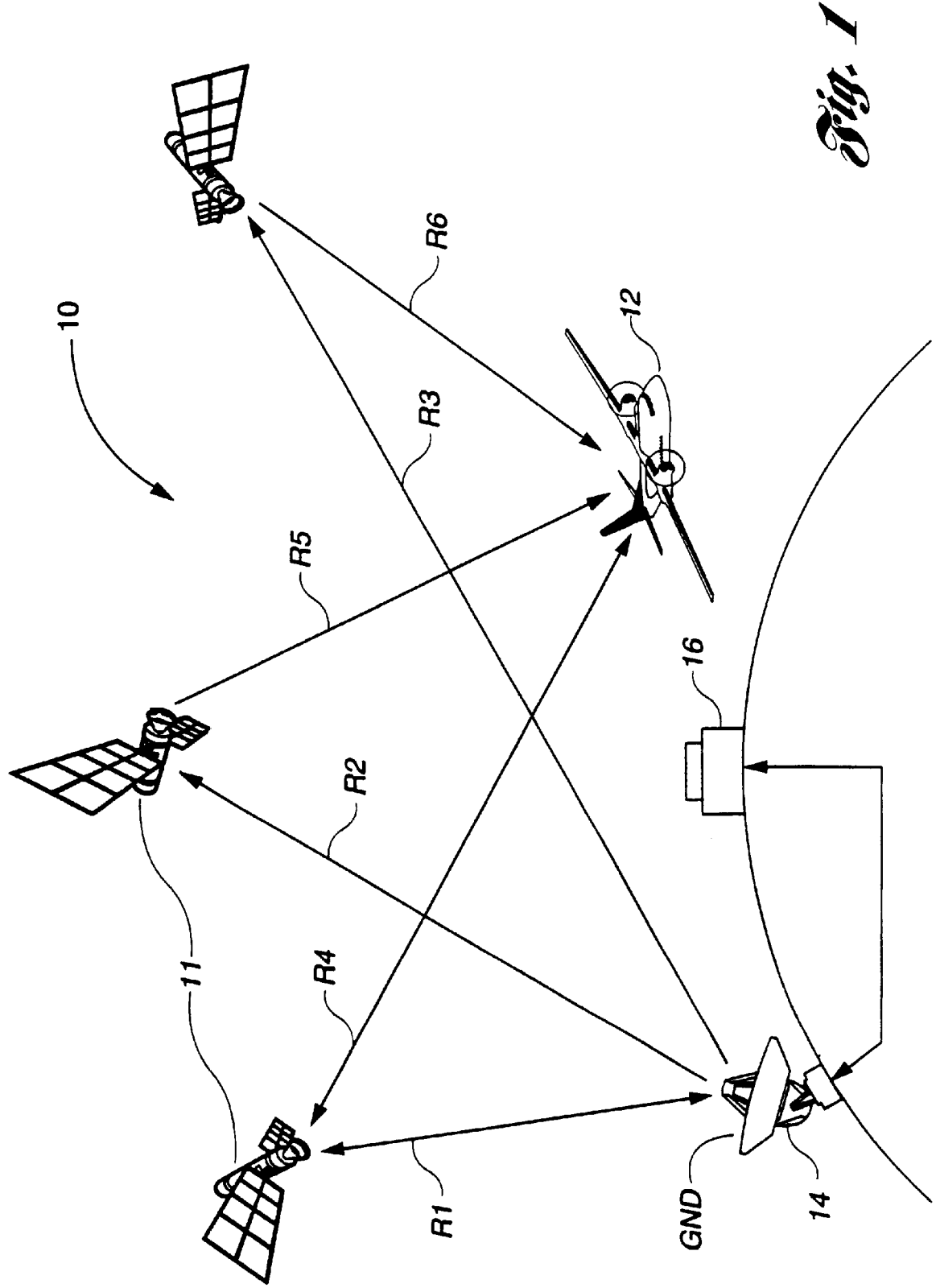
FIG. 1 is a diagrammatic representation illustrating a communication system employing the method and apparatus of the present invention.

Referring first to FIG. 1, a communication system 10 with a typical geometry for practicing the present invention is diagrammatically illustrated. In general, the system 10 includes a target object 12, represented by an aircraft 12 in the preferred embodiment, although Earth-bound vehicles are also trackable with the present invention. A plurality of communicatior satellites 11 through which aircraft 12 communicates with at least one traffic controller station 16 via a satellite ground station 14 are within the field of view of aircraft 12 at a given time.

Communication satellites 11 are preferably in multiple planes using Low Earth Orbit (LEO) satellite constellations and/or Medium Earth Orbit (MEO) satellite constellations such as Iridium, Intermediate Circular Orbit (ICO), Teladesic or Globalstar. In addition, a Geosynchronous Earth Orbit (GEO) satellite constellation may also be used in conjunction with the LEO and/or MEO satellite constellations. The planned ICO configuration with ten to twelve satellites in two planes is adequate to implement the position location and tracking of aircraft 12 for navigation and landings (up to Category I) while providing the necessary global coverage.

Multiple dynamic communication links between aircraft 12 and a satellite ground station 14 are achieved via the plurality of communication satellites 11, which are then utilized to derive independent estimates of the positions and velocities (state vectors) of aircraft 12. To obtain more accuracy and flexibility, the present invention employs a polystatic configuration. A polystatic configuration consists of several transceivers at separated locations, which cooperate with each other. The transceivers may be stationary or moving.

In a monostatic configuration, the forward and return ranging signals propagate through the same link. As such, the equal range locations of the measurement are confined to a spherical surface centered on the relay satellite position with a radius (range) equal to a distance between aircraft 12 and the relay satellite. By utilizing polystatic techniques, in which the forward and return ranging signals propagate through different satellites, the equal range locations of the measurement are confined to an ellipsoidal surface. The two foci are located at the satellite positions so that the sum of the distances between aircraft 12 and the two satellites 11 is a constant.

Satellite ground station 14, such as a Satellite Access Node (SAN), transmits a ranging signal to a targeted object, such as aircraft 12, via one of communication satellites 11. Aircraft 12 then retransmits a data message back down to ground station 14 via the same communication satellite 11 or a different one or set of communication satellites 11 utilizing polystatic techniques. Preferably, traffic controller station 16 informs the aircraft 12 of which return link strategy to employ prior to initiation of the two-way ranging. Each ranging signal transmitted by satellite ground station 14 may be forwarded to the same satellite 11 and then the retransmitted data messages from aircraft 12 may be forwarded through different satellites 11. Thus, the forward and return ranging signals can propagate through various links via different satellites, i.e., for each forward path, there are N return paths available for a total of N×N possible links.

The positions in space of communication satellites 11 are known so that corresponding ranges $R_1$, $R_2$, and $R_3$ between each of communication satellites 11 and satellite ground station 14 are known. However, ranges $R_1$, $R_2$ and $R_3$ can be calibrated over time to obtain a more accurate measurement. The links $R_4$, $R_5$, and $R_6$ are then employed to determine the state vectors by two-way ranging from satellite ground station 14 to aircraft 12. The time difference between transmission of the ranging signal by the satellite ground station 14 and receipt by the satellite ground station 14 of the responding ranging signal from aircraft 12 is used in determining ranges $R_4$, $R_5$, and $R_6$.

In determining the position and velocity of aircraft 12, the present invention may be utilized in conjunction with GPS. When GPS signals are available, the GPS signals are used to derive the aircraft state vector which is then transmitted to traffic controller station 16, such as an Air Traffic Controller (ATC) facility, via communication satellites 11 and satellite ground station 14. Preferably, the ATC facility 16 has signal processing capability. Alternatively, the signal processing capability may be located at satellite ground station 14. Simultaneously, ranging signals are sent by satellite ground station 14 via communication satellites 11 to a targeted aircraft, such as aircraft 12. Aircraft 12 then retransmits this ranging signal on a return link back to satellite ground station 14. The returned two-way ranging signals are detected and tracked in time and frequency by satellite ground station 14. Measured time and frequency values from multiple satellite links are compared to predicted values. Improved estimation of the aircraft state vectors is accomplished through data fusion of the two independent measurements, i.e, the GPS measurement and the two-way ranging measurement. The updated aircraft state vectors are then transmitted to aircraft 12.

The time stamps through various forward links arrive at aircraft 12 in different time slots. It is possible to allow fixed processing delays to multiplex the time stamps together, and then transmit the multiplexed ranging signal through different return links simultaneously or sequentially. However, it is also possible to transmit the multiplexed signal through a single return link to save return link space assets when needed. Similarly, the present invention is flexible enough to save forward link assets also. In addition, it is possible to use ICO satellites either as forward or as return link relays (not both) and to utilize other (GEO, MEO or LEO) mobile satellites as the complementary link relays.

Figure 2:
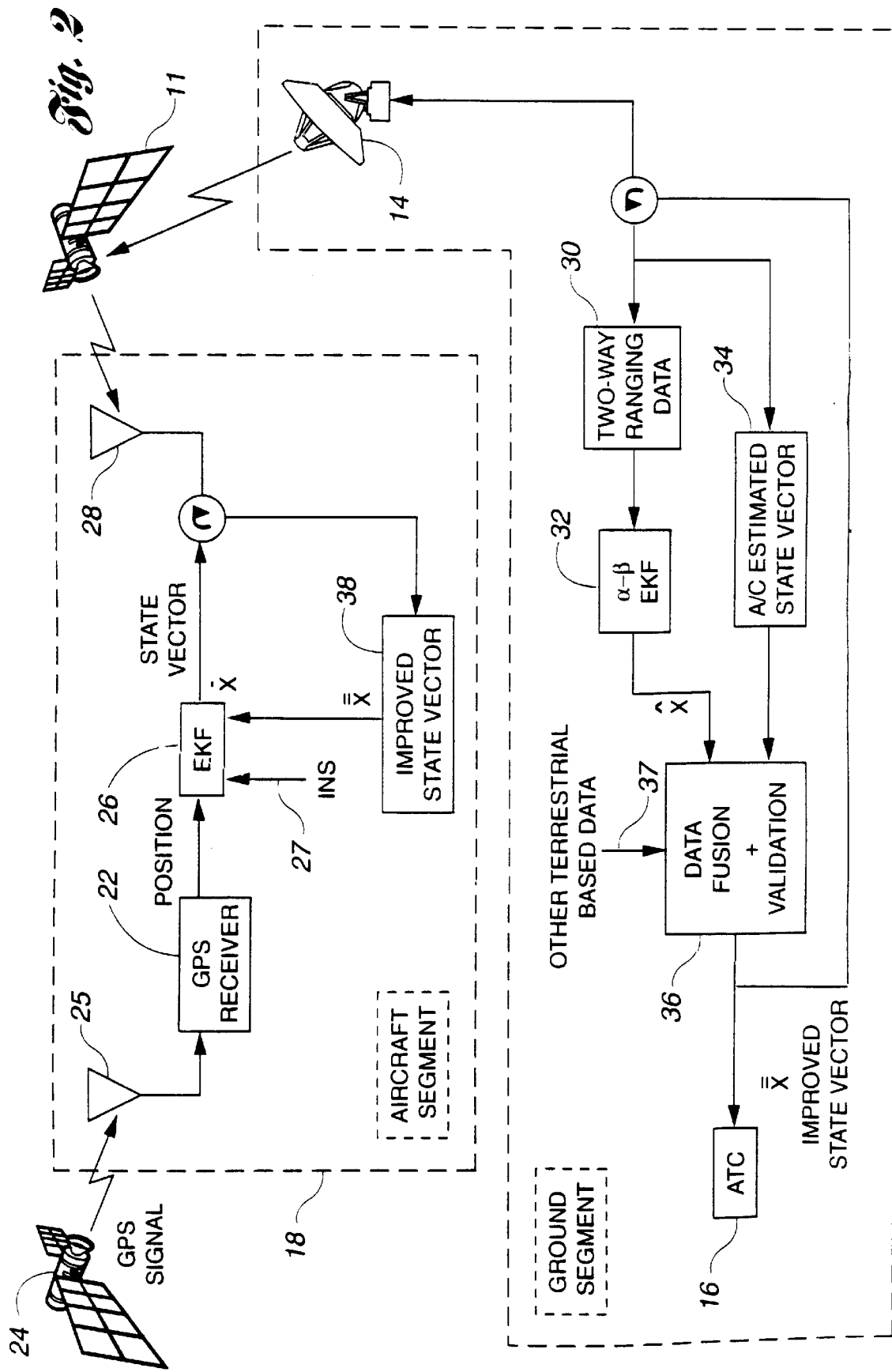
FIG. 2 is a block diagram of the aircraft segment and the ground segment included in the system shown in FIG. 1.

Turning now to FIG. 2 there is shown simplified block diagrams of both an aircraft segment 18 and a ground segment 20 of the present invention. Aircraft segment 18 includes a conventional GPS receiver 22 for receiving GPS signals from a GPS satellite 24 via an antenna 25. GPS receiver 22 sends a position signal to a conventional Extended Kalman-Filter (EKF) 26 which tracks the position signal as a state vector. An optional input 27 to EKF 26 is a signal from an Inertial Navigation System (INS), such as a conventional mechanical gyro system which monitors the distance traveled by aircraft 12 from a predetermined position.

Aircraft 12 receives the ranging signals from communication satellites 11 via a second antenna 28. Second antenna 28 is preferably a retrodirective antenna implemented with a Butler matrix, a low-profile digital beam former, and Wavelet-based Finite-Impulse-Response (WFIR) signal processing. The retrodirective antenna measures the direction of the received signal from communication satellite 11 and automatically transmits the return signal back to the same or a different one of communication satellites 11. The Butler matrix implements a Fourier transform forming a set of nearly orthogonal beams covering the field-of-view and is a relatively inexpensive approach to realizing a retro-directive antenna. The low-profile digital beam former array lends itself to a thin conformal array configuration which is preferred for aircraft installation. optionally, a tracking antenna can be used in place of the retrodirective antenna which consists of either an electronically or mechanically steered antenna driven by a monopulse, step-scanned, or conically-scanned tracking loop.

In order to utilize polystatic techniques in the present invention, a digital implementation of the Butler matrix is also preferred, such as a conjugate gradient digital beam former, in order to memorize the phase gradients of signals from various communication satellites 11, i.e, the direction of the incoming signals, and to apply proper phase conjugations to the outgoing signals so that the outgoing signals are directed to the appropriate communication satellites 11.

Figure 3:
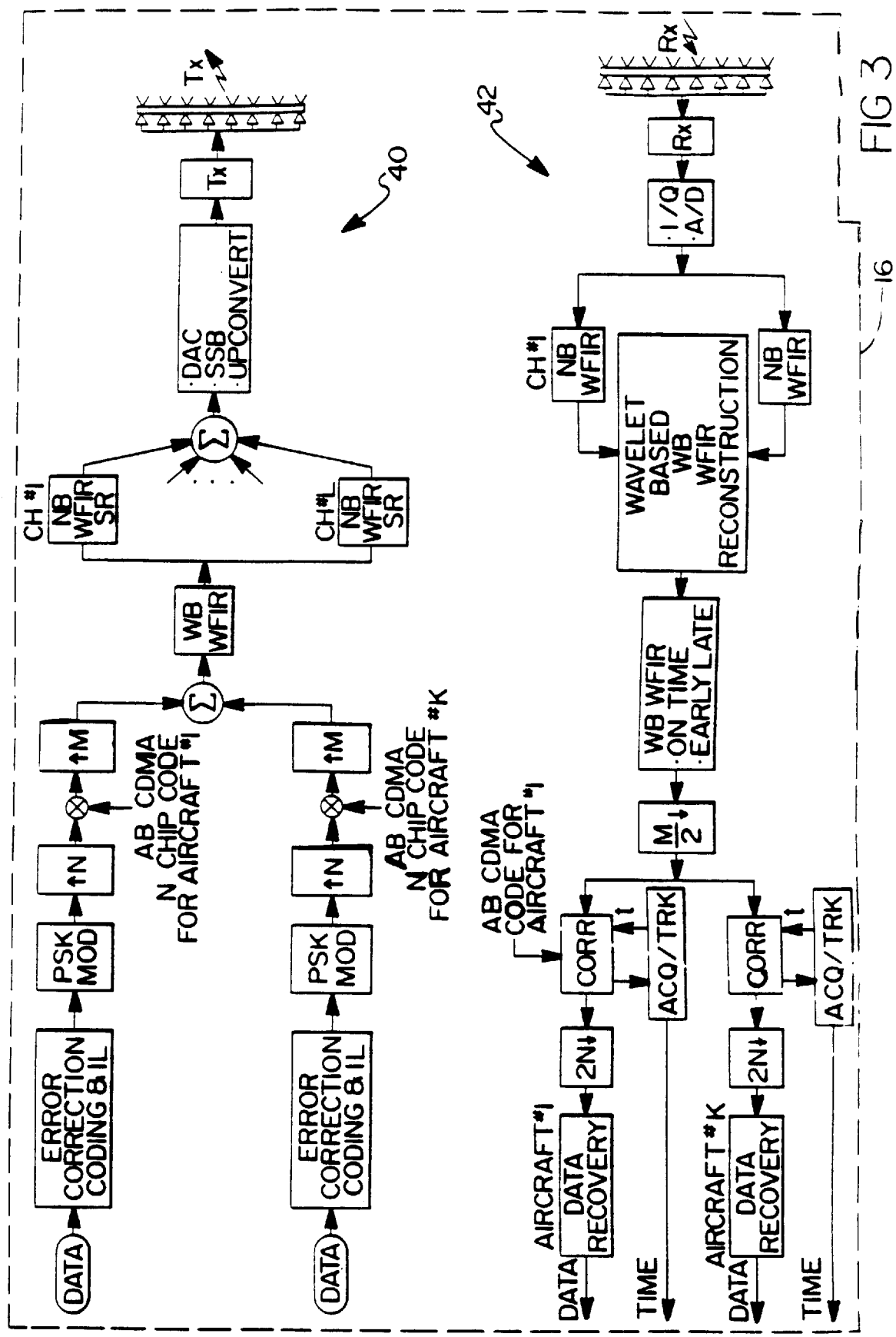
FIG. 3 is a block diagram of a preferred transmitter and a preferred receiver for the traffic controller station used in the system of FIG. 1.

The data between aircraft segment 18 and ground segment 20 can be combined with the unique ranging code signal in one of several ways: 1) Overlaying a Auslander-Barbano (AB) Code Division Multiple Access (CDMA) tracking code on the communication link channels as low-level Additive White Gaussian Noise (AWGN), thermal noise-like signals which slightly raise the thermal noise floor; 2) Modulating the communication data with the AB CDMA ranging code and sent as a single waveform, as shown in FIG. 3; and 3) Separating the ranging links from data links. In the preferred embodiment shown in FIG. 3, ATC facility 16 transmits data which is modulated by a WFIR waveform with a unique AB ranging code assigned to each aircraft being tracked in the particular time slot. WFIR modulation enables the ranging signals to have variable resolution in addition to variable length. The waveform specifically provides a means to transmit a relatively wide-band WFIR ranging waveform over a group of narrow-band communication satellite channels, simultaneously or sequentially, and supports simultaneous ranging/doppler measurements and data demodulation.

The two-way ranging data 30 is sent to ground segment 20 via satellite ground station 14. Two-way ranging data 30 is used to drive a dual alpha-beta ($\alpha$-$\beta$)/EKF tracking loop 32 wherein the fast $\alpha$-$\beta$ loop tracks the AB CDMA code in communication coordinates, and the slow EKF tracks the target aircraft in Earth Centered Inertial (ECI) coordinates to provide a unique preferred tracking architecture with low-complexity, high accuracy, and high integrity with fast-response valid-track metrics, and the ability to track out total-electron-content (TEC) induced waveform transmission range and doppler offsets.

The $\alpha$-$\beta$ loop is a relatively fast pair of time and frequency tracking loops which measure and smooth the received two-way ranging signals during each access. The four-dimensional state vector Z for the $\alpha$-$\beta$ loop consists of the timing offset, time drift, frequency offset and frequency drift. Time drift refers to clock drift whereas frequency offset refers to doppler shift due to link motion plus TEC. The state vector X for the EKF loop has 11 components consisting of the three-dimensional ECI position coordinates, velocity, acceleration, and the ranging plus doppler coordinates associated with ionospherical TEC effects.

Based on the $\alpha$-$\beta$ observation data from a previous access, the EFK loop predicts its state $X_k$ at the state transition time k*T, where T is the update interval for the EKF. This state is mapped into the corresponding predicted state $Z_k$ of the $\alpha$-$\beta$ loop. During the access slot time $\Delta$T, the $\alpha$-$\beta$ loop generates a smoothed state $Z_k$ which is then used by the EKF to smooth the predicted state to generate smoothed the state $X_k$. This allows the EKF to predict the state $X_{k+1}$ at (k+1)*T. This procedure is repeated for the next access.

The predicted state vector from dual $\alpha$-$\beta$/EKF tracking loop 32 and the estimated state vector 34 from aircraft 12 are transmitted to a processor 36 which performs data fusion and validation between the two independent measurements to obtain an improved state vector estimation. Processor 36 also receives other terrestrial based data 37, such as position of satellite ground station 14 and position of communication satellites 11. The improved state vector estimation is forwarded to ATC facility 16 which then transmits this information to aircraft 12. The improved state vector estimation 38 received by aircraft 12 is processed by EKF 26 to generate a new state vector.

Referring now to FIG. 3, additional details of the receiver and transmitter used in traffic controller station 16 are shown comprising a transmitter 40 and a receiver 42. Satellite ground station 14 transmits data which is modulated by a wavelet-based finite impulse response (WFIR) waveform with a unique AB ranging code assigned to each aircraft 12 being tracked in the access time slot. The TDMA data to the targeted aircraft is modulated by the N-chip AB code sequence, unsampled by the WFIR sample rate M, and added with signals to other aircraft sharing the same access slot. The summed output is filtered by a wideband WFIR filter with overlaid envelope of the AB ranging waveforms. A bank of narrowband WFIR filters channelizes the wideband waveform into a set of narrowband waveforms which are compatible with the satellite communication channels such as ICO.

The receive processing at satellite ground station 14 is shown at 42. The baseband signal from the digitizer, shown as an analog-to-digital (A/D) function and an in-phase-quadrature (I/Q) function which may be combined is detected by a bank of narrowband (NB) WFIR filters matched to the ICO communication channels. The outputs are used to perform reconstruction of the wideband WFIR ranging signal for each aircraft. This reconstructed wideband WFIR waveform is then detected by on-time, early, and late correlators. The ranging time and data from each aircraft is recovered by separate processing which performs the AB CDMA despreading, acquisition, tracking, time recovery, and data recovery.

Figure 4:
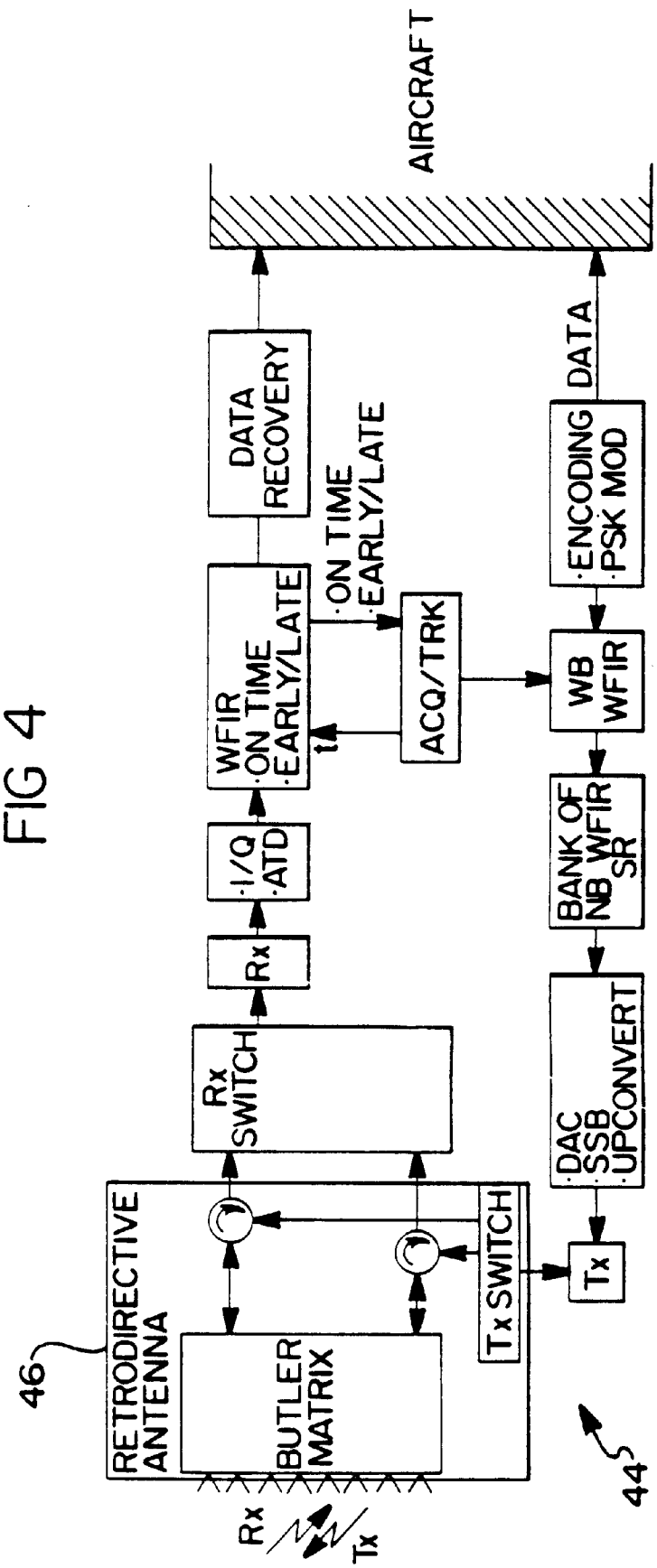
FIG. 4 is a block diagram of a preferred transmitter and a preferred receiver for a vehicle in the system of FIG. 1.

As best shown in FIG. 4, aircraft receiver/transmitter 44 preferably includes a retro-directive antenna 46. A Butler matrix, low profile digital beam form (DBF), and WFIR signal processing are preferably employed. Retrodirective antenna 46 measures the direction of the received signal from satellite 11, and automatically transmits the return signal back to an appropriate satellite 11. The Butler matrix implements a Fourier transform forming a set of nearly orthogonal beams covering the field of view, and has been proven to be a relatively inexpensive approach to realize a retrodirective antenna. The low profile DBF array lends itself to a thin conformal array configuration which is preferred for aircraft installation. The implementation technique eliminates the need for an expensive tracking antenna on the aircraft which usually consists of either an electronically or a mechanically steered antenna driven by a monopulse, step-scanned, or conically-scanned tracking loop.

The present invention works in many multiple-satellite constellations or combinations of multiple constellations. The present invention improves position and velocity accuracy in tracking a target transceiver unit and provides a simple method to access more resources from space assets other than one constellation alone. Even if the GPS or GLONASS systems malfunction, the present invention still provides adequate position location and tracking measurements for global air traffic control without complex clock and processing requirements.

While the best modes for carrying out the invention have been described in detail, those familiar with the art to which this invention relates will recognize various alternative designs and embodiments for practicing the invention as defined by the following claims.

What is claimed is:

1. A method for determining a position of an object, the method comprising:

transmitting a first ranging signal from a satellite ground station to the object via a first satellite at a first known location;

transmitting a second ranging signal from the object to the first satellite in response to the first ranging signal for receipt by the satellite ground station;

transmitting a third ranging signal from the satellite ground station to the object via a second satellite at a second known location;

transmitting a fourth ranging signal from the object to the first satellite in response to the third ranging signal for receipt by the satellite ground station;

transmitting a fifth ranging signal from the satellite ground station to the object via a third satellite at a third known location;

transmitting a sixth ranging signal from the object to the first satellite in response to the fifth ranging signal for receipt by the satellite ground station;

determining a first delay corresponding to a time difference between transmission of the first ranging signal by the satellite ground station and receipt of the second ranging signal by the satellite ground station;

determining a second delay corresponding to a time difference between transmission of the third ranging signal by the satellite ground station and receipt of the fourth ranging signal by the satellite ground station;

determining a third delay corresponding to the time difference between transmission of the fifth ranging signal by the satellite ground station and receipt of the sixth ranging signal by the satellite ground station; and determining the position of the object based on the first, second, and third known locations and the first, second, and third delays.

2. The method as recited in claim 1 wherein transmitting the first, third, and fifth ranging signals includes transmitting a ranging code relating to the object.

3. The method as recited in claim 1 wherein the object is an aircraft.

4. The method as recited in claim 1 wherein the object is a surface vehicle.

5. A system for determining a position of an object, the system comprising:

a satellite ground station;

a first satellite at a first known location, wherein the satellite ground station transmits a first ranging signal to the object via the first satellite, wherein the object transmits a second ranging signal to the first satellite in response to the first ranging signal for receipt by the satellite ground station;

a second satellite at a second known location, wherein the satellite ground station transmits a third ranging signal to the object via the second satellite, wherein the object transmits a fourth ranging signal in response to the third ranging signal to the first satellite for receipt by the satellite ground station; and a third satellite at a third known location, wherein the satellite ground station transmits a fifth ranging signal to the object via the third satellite, wherein the object transmits a sixth ranging signal to the first satellite in response to the fifth ranging signal for receipt by the satellite ground station;

wherein the satellite ground station determines a first delay corresponding to a time difference between transmission of the first ranging signal by the satellite ground station and receipt of the second ranging signal by the satellite ground station, a second delay corresponding to a time difference between transmission of the third ranging signal by the satellite ground station and receipt of the fourth ranging signal by the satellite ground station, and a third delay corresponding to a time difference between transmission of the fifth ranging signal by the satellite ground station and receipt of the sixth ranging signal by the satellite ground station, and determines the position of the object based on the first, second, and third known locations and the first, second, and third time delays.

6. The system as recited in claim 5 further comprising a traffic control station in communication with the satellite ground station, wherein the traffic control station includes a signal processor for determining the position of the object.

7. The system as recited in claim 5 wherein the first, third, and fifth ranging signals include a ranging code relating to the object.

8. The system as recited in claim 5 wherein the object is an aircraft.

9. The system as recited in claim 5 wherein the object is a surface vehicle.

* * * * *